United States Patent
Norris

(10) Patent No.: US 10,626,901 B2
(45) Date of Patent: Apr. 21, 2020

(54) COLLAPSIBLE PLANAR BOARD APPARATUS

(71) Applicant: Todd Norris, Lander, WY (US)

(72) Inventor: Todd Norris, Lander, WY (US)

( * ) Notice: Subject to any disclaimer, the term of this patent is extended or adjusted under 35 U.S.C. 154(b) by 189 days.

(21) Appl. No.: 15/992,093

(22) Filed: May 29, 2018

(65) Prior Publication Data
US 2019/0368522 A1 Dec. 5, 2019

(51) Int. Cl.
*A01K 73/10* (2006.01)
*F16B 5/02* (2006.01)

(52) U.S. Cl.
CPC .......... *F16B 5/0216* (2013.01); *A01K 73/10* (2013.01); *F16B 5/0266* (2013.01)

(58) Field of Classification Search
CPC ...... A01K 91/08; A01K 91/06; A01K 73/045; A01K 73/04
USPC ........................................ 43/27.2
See application file for complete search history.

(56) References Cited

U.S. PATENT DOCUMENTS

| | | | | |
|---|---|---|---|---|
| 1,723,236 A | * | 8/1929 | Hansen | A01K 91/06 43/43.13 |
| 3,230,660 A | * | 1/1966 | Meyers | A01K 91/06 43/43.13 |
| 3,410,014 A | * | 11/1968 | Jenssen | A01K 73/045 43/9.7 |
| 4,703,580 A | * | 11/1987 | Kammeraad | A01K 91/08 428/12 |
| 5,341,591 A | * | 8/1994 | Hicks | A01K 73/045 43/43.13 |
| 5,548,919 A | * | 8/1996 | Hicks | A01K 91/08 43/43.13 |
| 6,412,215 B1 | * | 7/2002 | Even | A01K 91/08 43/43.13 |
| 7,367,153 B1 | | 5/2008 | Koch | |
| 9,615,561 B2 | * | 4/2017 | Osborn | A01K 91/08 |
| 2003/0033967 A1 | * | 2/2003 | Hayman, III | B63B 1/107 114/61.15 |
| 2008/0307692 A1 | * | 12/2008 | Hagen | A01K 91/08 43/43.13 |
| 2017/0150707 A1 | * | 6/2017 | Wakefield | A01K 91/08 |
| 2019/0053479 A1 | * | 2/2019 | Vergara | A01K 91/08 |

* cited by examiner

*Primary Examiner* — Christopher P Ellis
(74) *Attorney, Agent, or Firm* — Peter J. Timbers

(57) ABSTRACT

An apparatus to expand and collapse planar board provided. The apparatus includes two planar boards and provides resistance to expansion and collapse.

10 Claims, 5 Drawing Sheets

COLLAPSIBLE PLANAR BOARD APPARATUS

FIELD OF THE INVENTION

This invention relates generally to a planar board apparatus for extension of a flotation apparatus from a boat to expand the number of fishing lines associated with a given boat.

BACKGROUND OF THE INVENTION

When fishing from a boat in a trolling fashion, it is often desirable to increase the effective span and number of fishing lines from the side of the boat in order to fish effectively more water. In order to fish more water during trolling fishing operations, a number of various planar boards have been developed. When a line is extended from the boat to the planar board apparatus additional fishing lines may be attached to the line connecting the boat and the planar board, thereby increasing the effective area and/or volume of fishing waters. A number of planar boards have been developed over the years. Often the planar boards are bulky and hard to handle. Some planar boards have been made collapsible, but often those boards have additional parts, breakable parts and are awkward to use because they collapsible too easily. Thus, there is a long-felt need for a collapsible planar board that is easy to use, does not have additional or breakable parts, remains rigid during slower motion or drifting and is easy to use. The instant invention accomplishes those goals and fulfils those long-felt needs.

SUMMARY OF THE INVENTION

Accordingly, it is an object of embodiments of the present invention to provide a collapsible planar board apparatus that remains rigid during drifting yet contains few parts and is easy to use.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. To achieve the foregoing and other objects, and in accordance with the purposes of the present invention, as embodied and broadly described herein, the invention comprises a collapsible planar board apparatus having a first planar board, a second planar board, a first s-bend square rod, a second s-bend square rod, a first bolt, a second bolt, a third bolt, a fourth bolt and a first spring washer; the first planar board having a first void and a second void; the second planar board having a third void and a fourth void; the first s-bend square rod having a first end, a middle portion and a second end, the first end extending parallel and opposite to the second end and the middle portion connecting the first end and the second end, the first end further comprising a first threaded hole and the second end further comprising a second threaded hole; the second s-bend square rod having a first end, a middle portion and a second end, the first end extending parallel and opposite to the second end and the middle portion connecting the first end and the second end, the first end further comprising a first threaded hole and the second end further comprising a second threaded hole; the first planar board first void adaptable to receive the first end of the first s-bend square rod and the first bolt secured to the first planar board above and below the first void and extending into the first void through the threaded hole of the first end of the first s-bend square rod; the third void adaptable to receive the second end of the first s-bend square rod and the third bolt secured to the second planar board above and below the third void and extending into the third void through the threaded hole of the second end of the first s-bend square rod; the second void adaptable to receive the first end of the second s-bend square rod and the second bolt secured to the first planar board above and below the second void and extending into the second void through the threaded hole of the first end of the second s-bend square rod; and the fourth void adaptable to receive the second end of the second s-bend square rod and adaptable to receive the first spring washer and the fourth bolt secured to the second planar board above and below the fourth void and extending into the fourth void through the threaded hole of the second end of the second s-bend square rod and through the first spring washer.

Benefits and advantages of the present invention include, but are not limited to, providing an apparatus to maintain separated planar boards the resistively fold and collapse.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
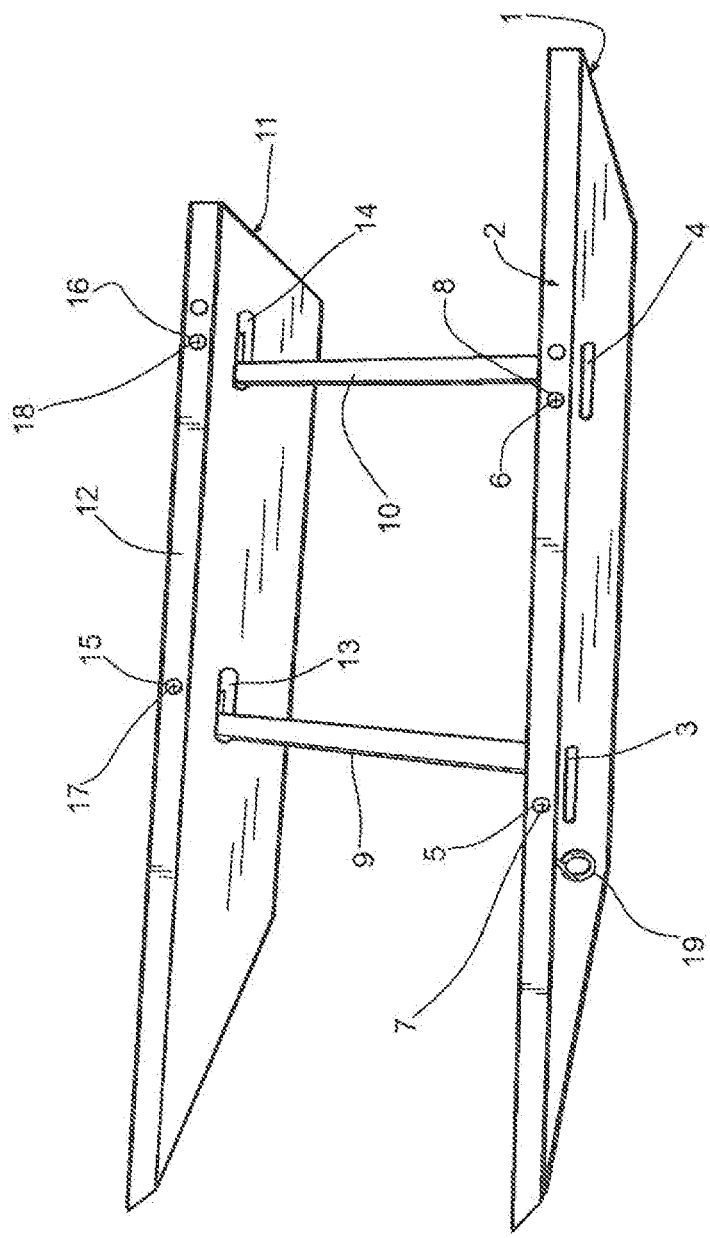
FIG. 1 illustrates a top side perspective view of one embodiment of the instant invention.

Reference will now be made in detail to embodiments of the invention, examples of which are illustrated in the accompanying drawings. Throughout the following detailed description, the same reference characters refer to the same or similar elements in all figures.

FIG. 1 shows a top side perspective view of one embodiment of the collapsible planar board invention in the fully extended configuration depicting a first planar board 1 with a top portion 2. In the body of the first planar board 1 there is a first void 3, a second void 4 and an attachment loop 19 affixed to the first planar board 1. The first planar board 1 has a first hole 5 that extends from the top portion 2 into the body of the planar board 1 both above and below the first void 3. Inside the first hole 5 is depicted a first bolt 7 that extends through the body of the planar board 1 and through the void space 3. The first bolt 7 penetrates the planar board 1 both above and below the first void 3. FIG. 1 depicts the second void 4 within the body of the first planar board 1. The first planar board 1 has a second hole 5 that extends from the top portion 2 into the body of the planar board both above and below the second void 4. Inside the second hole 6 is depicted a second bolt 8 that extends through the body of the planar board 1 and through the second void 4. The second bolt 8 penetrates the planar board 1 both above and below the second void 4. FIG. 1 and subsequent figures show a hole, further to the right of second hole 6 that allows for alternative placement of the second bolt 8 into the first planar board 1.

FIG. 1 also shows a second planar board 11 with a top portion 12. In the body of the second planar board 11 there is a third void 13 and a fourth void 14. The second planar board 11 has a third hole 15 that extends from the top portion 12 into the body of the second planar board 11 above and below the third void 13. Inside the third hole 15 is depicted a third bolt 17 that extends through the body of the second planar board 1 and through the third void space 13, the third bolt 17 penetrates the second planar board 11 both above and below the third void 13. FIG. 1 depicts in the body of the second planar board 11 that there is a fourth void 14. The second planar board 11 has a hole 15 that extends from the top portion 12 of the second planar board 11 into the body of the second planar board 11 and above and below the fourth void 14. Inside the fourth hole 16 is depicted a fourth bolt 18 that extends through the body of the second planar board 1 and through the fourth void 14. The fourth bolt 18 penetrates the second planar board 11 both above and below the fourth void 14. FIG. 1 and subsequent figures show a second hole, further to the right of fourth hole 16 that allows for alternative placement of the fourth bolt 18 into the second planar board 11.

FIG. 1 depicts a first s-bend square rod 9 and a second s-bend square rod 10. The first s-bend square rod 9 has two ends, one end is disposed into the first void 3 of the first planar board 1 and the other end is disposed in the second void 13 of the second planar board 11. The second s-bend square rod has two ends, one end is disposed into the second void 4 of the first planar board 1 and the other end is disposed in the fourth void 14 of the second planar board 11.

Figure 2:
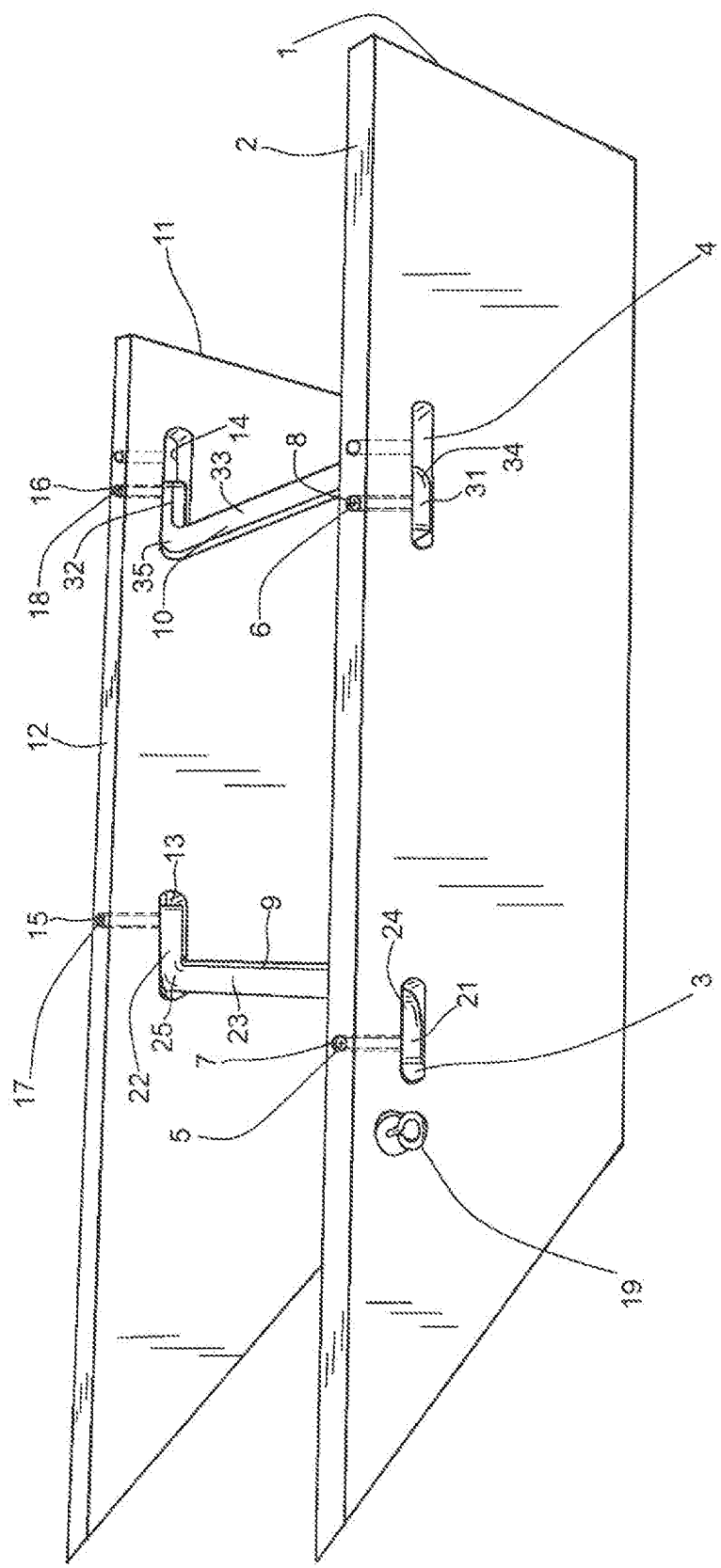
FIG. 2 illustrates a side top perspective view of one embodiment of the present invention.

FIG. 2 depicts the connectivity of the first s-bend square rod 9 having a first end 21 extending parallel and opposite to the second end 22 with a middle portion 23 therebetween. The middle portion 23 is generally perpendicular to the first end 21 and the second end 22. The first end 21 is disposed in the first void 3 and the second end 22 is disposed in the third void 13. The first bolt 7 extends through the first planar board 1 and through the first void 3 and the first end 11 of the first s-bend square rod 9. The third bolt 17 extends through the second planar board 11 and through the third void 13 and the second end 22 of the first s-bend square rod 9.

FIG. 2 also depicts the connectivity of the second s-bend square rod 10 having a first end 31 extending parallel and opposite to the second end 32 with a middle portion 33 therebetween. The middle portion 33 is generally perpendicular to the first end 31 and the second end 32. The first end 31 is disposed in the second void 4 and the second end 32 is disposed in the fourth void 14. The second bolt 8 extends through the first planar board 1 and through the second void 4 and the first end 31 of the second s-bend square rod 10. The fourth bolt 18 extends through the second planar board 11 and through the fourth void 43 and the second end 32 of the second s-bend square rod 10.

The first hole 5, second hole 6, third hole 15 and fourth hole 16 are depicted with dashed lines, and in one embodiment at least a portion of each of these holes are threaded. In FIG. 2, it is understood that the first bolt 7, second bolt 8, third bolt 17 and fourth bolt 18 extend through the first hole 5, second hole 6, third hole 15 and fourth hole 16 respectively.

Figure 3:
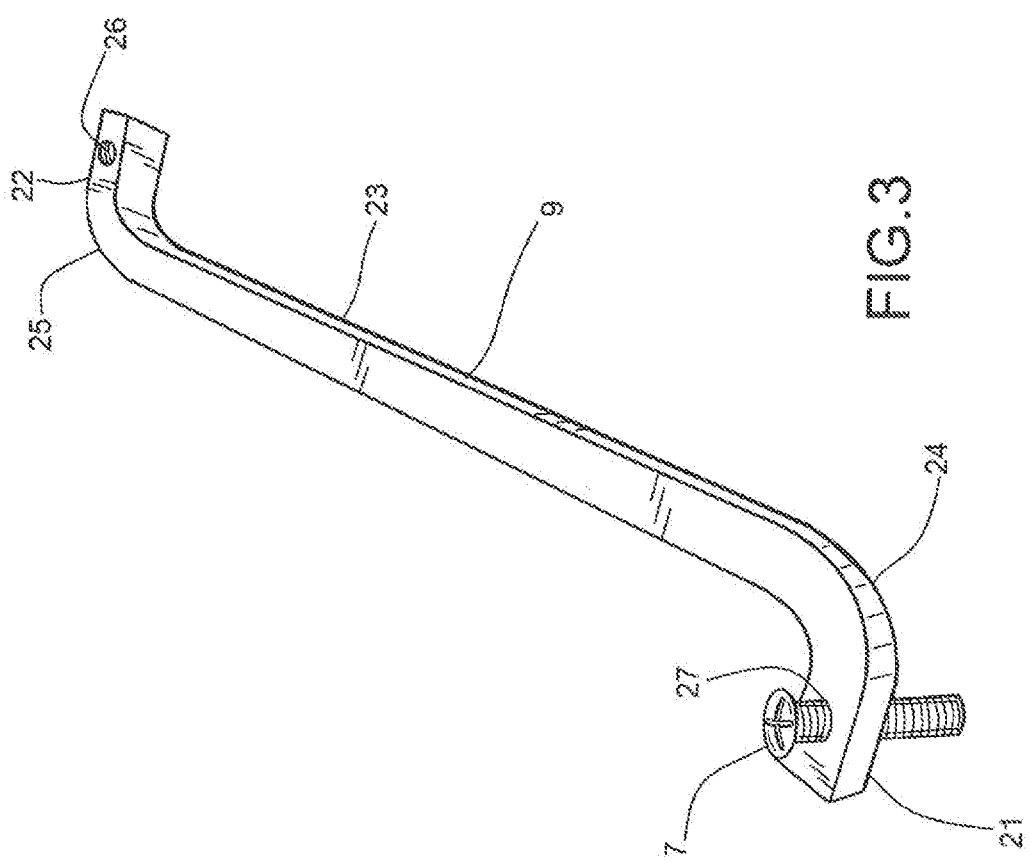
FIG. 3 illustrates a front top perspective view of an s-bend square rod of one embodiment of the present invention.

FIG. 3 depicts the first s-bend square rod 9. In FIG. 3, the first end 21 is connected to the middle portion 23 through the first bend 24. The first end has a threaded hole 27 through which the first bolt 7 is inserted and affixed to the first planar board 1. The second end 22 of the first s-bend square rod 9 is connected to the middle portion 23 through the second bend 25. The second end has a threaded hole 26 through which the not depicted third bolt 17 would be inserted and affixed to the second planar board 11.

Although not depicted in FIG. 3, the second s-bend square rod 10 is configured similarly to the first s-bend square rod 9. In the second s-bend square rod, first end 31 is connected to the middle portion 33 though a first bend. The first end has a threaded hole through which the second bolt 8 is inserted and affixed to the first planar board 1. The second end 32 of the second s-bend square rod is connected to the middle portion 33 through a second bend. The second end has a threaded hole through which the fourth bolt 18 is inserted and affixed to the second planar board 11.

Figure 4:
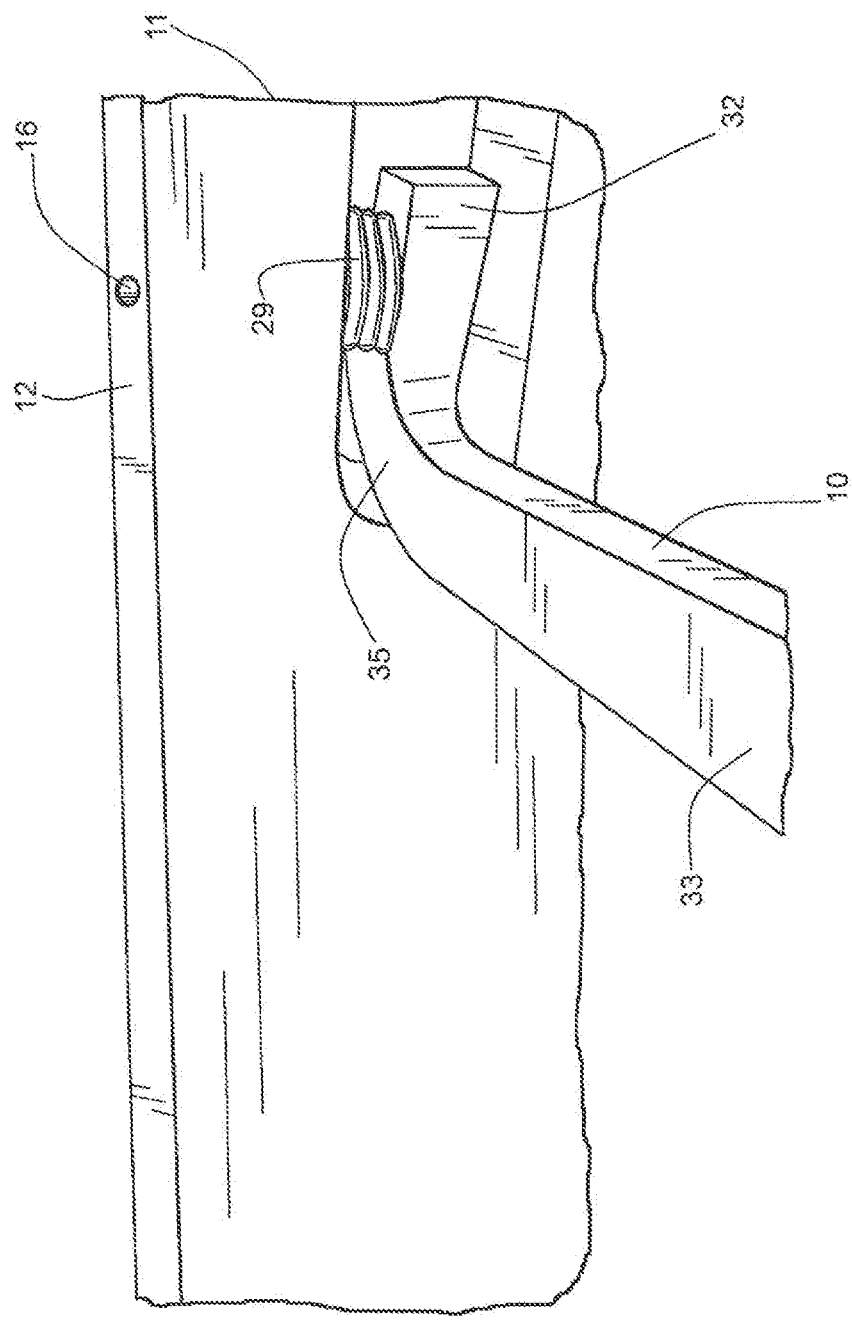
FIG. 4 illustrates a side top perspective view of the s-bend square rod and the spring washer attached to the inside void in the second planar board in one embodiment of the instant invention.

FIG. 4 depicts the second s-bend square rod 10 attached to the second planar board 11 with a spring washer 29 disposed therebetween. In this particular embodiment of the instant invention, the spring washer is disposed above the second end 32 of the second s-bend square rod 10, it is within the scope of the instant invention that the spring washer 29 could be below the second end 32. Although not depicted, it is also with the scope and claims of the instant invention that additional spring washer be disposed in the void space 3, void space 4 and void space 13. In FIG. 4, fourth bolt 18 would be inserted through hole 16, through the spring washer 29, the hole in the second end 32 of the second s-bend square rod and into the second planar board 11 both above and below the void 14. In the instant invention, the spring washer is any washer selected from the group consisting of a belleville washer, a split washer, a wave disc spring washer, a compressi washer, a compression washer a, waring spring washer, a split lock washer and a polywave washer, a disc spring washer or any other washer that creates increased frictional force between the bolt and the s-bend square rod.

Figure 5:
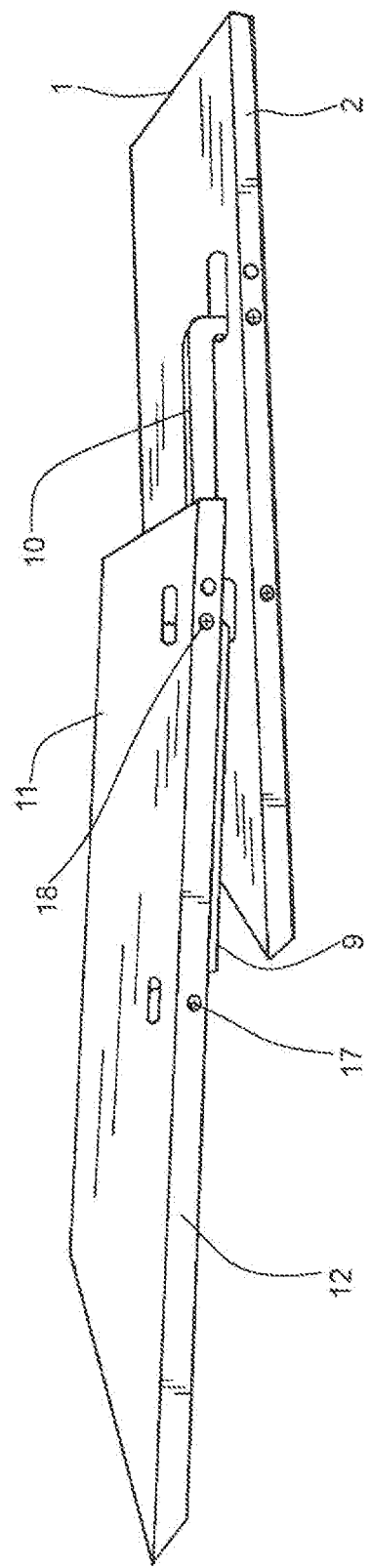
FIG. 5 illustrates a top perspective view of one embodiment of the present invention in a folded or collapsed position.

FIG. 5 depicts the collapsible planar board in the collapsed configuration. It is anticipated within the scope of this invention that in the collapsed configuration, the first planar board 1 and the second planar board 11 may be either parallel of nearly parallel to allow for easy storage. The spring washer provides resistance as the collapsible planar board folds from a fully extended configuration and a collapsed configuration. The first and second planar board may be made of one or more of any material selected from the group consisting of wood, aluminum, plastic, polymer fiber glass, composites, Styrofoam and steel, or any other material well-known in the boating and flotation arts.

It is believed that the apparatus of the present invention and many of its attendant advantages will be understood from the foregoing description. It is also believed that it will be apparent that various changes may be made in the form, geometry, construction, and arrangement of the components without departing from the scope and spirit of the invention and without sacrificing its material advantages. The forms described are merely exemplary and explanatory embodiments thereof. It is the intention of the following claims to encompass and include such changes.

What is claimed is:

1. A collapsible planar board apparatus comprising a first planar board, a second planar board, a first s-bend square rod, a second s-bend square rod, a first bolt, a second bolt, a third bolt, a fourth bolt and a first spring washer;

said first planar board having a first void and a second void;

said second planar board having a third void and a fourth void;

said first s-bend square rod having a first end, a middle portion and a second end, said first end extending parallel and opposite to said second end and said middle portion connecting said first end and said second end, said first end further comprising a first threaded hole and said second end further comprising a second threaded hole;

said second s-bend square rod having a first end, a middle portion and a second end said first end extending parallel and opposite to said second end and said middle portion connecting said first end and said second end, said first end further comprising a first threaded hole and said second end further comprising a second threaded hole;

said first planar board first void adaptable to receive said first end of said first s-bend square rod and said first bolt secured to the first planar board above and below the first void and extending into the first void through the threaded hole of the first end of the first s-bend square rod;

said third void adaptable to receive said second end of said first s-bend square rod and said third bolt secured to the second planar board above and below the third void and extending into the third void through the threaded hole of the second end of the first s-bend square rod;

said second void adaptable to receive said first end of said second s-bend square rod and said second bolt secured to the first planar board above and below the second void and extending into the second void through the threaded hole of the first end of the second s-bend square rod; and said fourth void adaptable to receive said second end of said second s-bend square rod and adaptable to receive said first spring washer and said fourth bolt secured to the second planar board above and below the fourth void and extending into the fourth void through the threaded hole of the second end of the second s-bend square rod and through the first spring washer.

2. The planar board of claim 1 further comprising an attachment loop affixed to the first planar board.

3. The planar board apparatus of claim 1 further comprising a second spring washer disposed in the first void between the first end of the first s-bend square rod and the first planar board.

4. The planar board apparatus of claim 1 further comprising a second spring washer disposed in the second void between the first end of the second s-bend square rod and the first planar board.

5. The planar board apparatus of claim 1 further comprising a second spring washer disposed in the third void between the second end of the first s-bend square rod and the second planar board.

6. The planar board apparatus of claim 1, wherein the spring washer is disposed and attached in the first void between the first end of first s-bend square rod and not in the fourth void.

7. The planar board apparatus of claim 1, wherein the spring washer is disposed and attached in the second void between the first end of second s-bend square rod and not in the fourth void.

8. The planar board apparatus of claim 1, wherein the spring washer is disposed and attached in the third void between the second end of first s-bend square rod and not in the fourth void.

9. The planar board apparatus of claim 1, wherein the first and second planar board comprises any material selected from the group consisting of wood, aluminum, plastic, polymer fiber glass, composites, Styrofoam and steel.

10. The planar board apparatus of claim 1, wherein the spring washer is any washer selected from the group consisting of a belleville washer, a split washer, a wave disc spring washer, a compressi washer, a compression washer, a waring spring washer, a split lock washer and a polywave disc spring washer.

* * * * *